Sept. 29, 1959     C. SIMPSON     2,906,917
TRACE IDENTIFIER FOR OSCILLOSCOPES

Filed June 11, 1957     2 Sheets-Sheet 1

INVENTOR.
CLARENCE SIMPSON
BY
ATTORNEY
AGENT

Sept. 29, 1959             C. SIMPSON             2,906,917

TRACE IDENTIFIER FOR OSCILLOSCOPES

Filed June 11, 1957                                  2 Sheets-Sheet 2

INVENTOR.
CLARENCE SIMPSON
BY Wade Koontz
ATTORNEY
James D. Shannon
AGENT

2,906,917
Patented Sept. 29, 1959

2,906,917
TRACE IDENTIFIER FOR OSCILLOSCOPES

Clarence Simpson, Webster, N.Y., assignor to the United States of America as represented by the Secretary of the Air Force Application June 11, 1957, Serial No. 665,107

5 Claims. (Cl. 315—13)

In recording a plurality of time functions on the screen of a multichannel oscilloscope the traces become difficult to identify if they cross one another, as occurs when the functions are of high amplitude and vary in frequency. It is the purpose of this invention to provide apparatus for use with multichannel oscilloscopes to mark the several traces for easy identification.

Briefly, in accordance with the invention, the above object is accomplished by intensity modulating each channel of the oscilloscope with characteristic identification marks. The identification marks are made by blanking the cathode-ray beam with the output of a keyed relaxation oscillator and are staggered to prevent confusion when two or more traces intersect.

Figure 1:
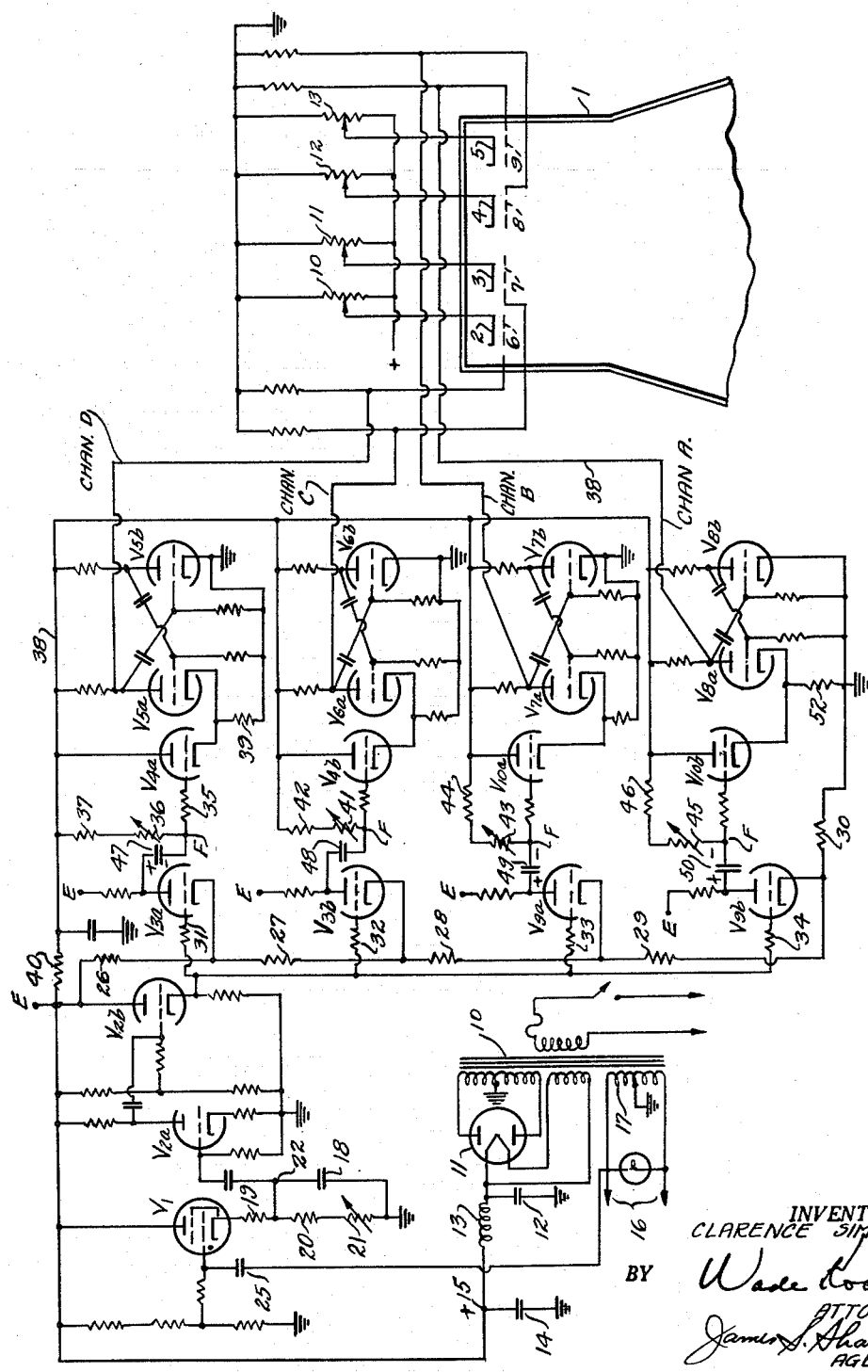
Figure 2:
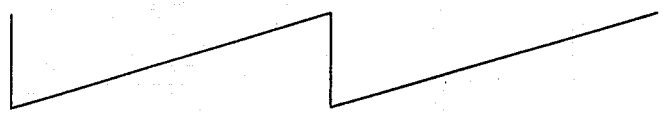
Figure 2:
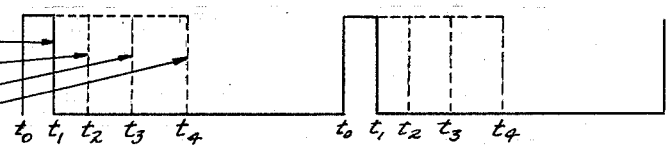
Figure 2:
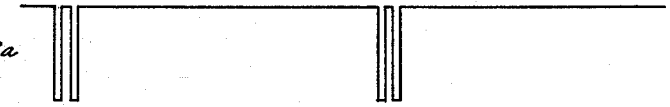
Figure 2:
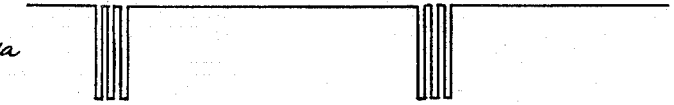
Figure 2:
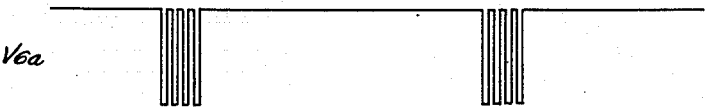
Figure 2:
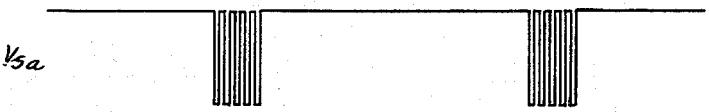

A more detailed description of the invention will be given in connection with the specific embodiment thereof shown in the accompanying drawing, in which Fig. 1 is a schematic circuit diagram of the trace marker;

Fig. 2 gives various waveforms in the circuit of Fig. 1; and

Figure 3:
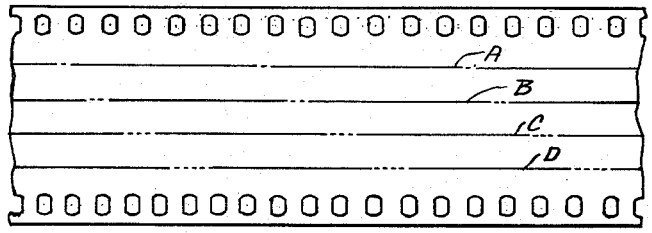

Fig. 3 shows the appearance of the marked traces.

Referring first to Fig. 3, this figure shows a 35 mm. film record made by photographing the screen of a four-channel oscilloscope employing the invention. In this method of recording, the oscilloscope has no horizontal sweep and the film, on which the screen of the oscilloscope is imaged, is moved past the image at constant speed. The drawing shows the nature of the marks used to identify the four traces A, B, C and D.

Referring now to Fig. 1, reference numeral 1 refers to the envelope of a four-channel oscilloscope having cathodes 2, 3, 4 and 5 and associated beam intensity control electrodes 6, 7, 8 and 9. Potentiometers 10, 11, 12 and 13 serve as means for individually adjusting the beam intensity or brightness in each of the four channels. The remainder of Fig. 1 operates to apply short negative blanking pulses to grids 6–9 over lines marked Chan. A–Chan. D for momentarily blanking the beam to provide identifying breaks in the trace. The circuit of Fig. 1 is energized from a power supply including transformer 10, rectifier 11 and filter elements 12, 13 and 14, providing high direct voltage at terminal 15 and cathode heater voltage at the terminals 16 of low voltage winding 17.

Gas tube $V_1$ operates in conjunction with condenser 18 and resistors 19, 20 and 21 as a relaxation oscillator to generate a 30 c.p.s. saw-tooth wave synchronized with the 60 c.p.s. voltage of winding 17. This circuit is conventional and its operation is briefly as follows: Considering $V_1$ to have fired, condenser 18 charges rapidly through the low resistance of the tube and the low resistance of current limiting resistor 19. As condenser 18 charges, the cathode potential rises and eventually extinguishes $V_1$. This action takes place very rapidly and is represented by part 23 of the waveform $a$ of Fig. 2. When conduction ends in $V_1$ condenser 18 begins a relatively slow discharge through resistors 20 and 21 forming the part 24 of the saw-tooth wave. As the condenser discharges the potential of the cathode of $V_1$ drops, eventually reaching a potential relative to that of the grid such that the tube again fires initiating a new cycle of operation. The exact moment of firing is controlled by an alternating voltage from winding 17 which is superimposed on the direct voltage of the grid by being applied to the grid through condenser 25. By adjusting the period of the relaxation oscillator through resistor 21 to approximately $\frac{1}{30}$ second, $V_1$ will be fired in alternate cycles of the transformer 17 60 c.p.s. voltage.

The saw-tooth wave at point 22 is amplified by $V_{2a}$ and applied to the grid of cathode follower $V_{2b}$. A cathode follower is used at this point to provide a low impedance source for the saw-tooth wave capable of withstanding large changes in load impedance without distortion. The load on $V_{2b}$ is subject to change due to grid conduction in stages coupled thereto as will be seen later.

The saw-tooth wave at the cathode of $V_{2b}$, shown at $b$ in Fig. 2, is applied to the grids of $V_{3a}$, $V_{3b}$, $V_{9a}$ and $V_{9b}$ in parallel. The grids of these tubes are normally biased negatively relative to their associated cathodes by means of a potential divider consisting of resistors 26, 27, 28, 29 and 30. The bias is beyond cut-off in each case but is not the same for each tube, being greatest for tube $V_{3a}$ which has the highest cathode potential and least for tube $V_{9b}$ which has the lowest cathode potential. As the grids of these tubes rise in potential, because of the saw-tooth voltage from the cathode of $V_{2b}$ being applied thereto, they will reach the cut-off point, near cathode potential, at different times, $V_{9b}$ becoming conductive first and $V_{3a}$ last. The grids of these tubes are prevented from going appreciably positive relative to their cathodes by resistors 31, 32, 33 and 34.

Tubes $V_{5a}$—$V_{5b}$, $V_{6a}$—$V_{6b}$, $V_{7a}$—$V_{7b}$ and $V_{8a}$—$V_{8b}$ are connected in identical free-running multivibrator circuits normally held in an off or nonoscillating condition. Referring specifically to the $V_{5a}$—$V_{5b}$ multivibrator, tube $V_{4a}$ is normally conductive due to its grid being returned through resistors 35, 36 and 37 to positive conductors 38. With $V_{4a}$ conductive the drop across resistor 39 is sufficient to bias $V_{5a}$ beyond cut-off. Under this condition the anode potential of $V_{5a}$ has its maximum value which is applied to beam intensity control electrode 6 of the oscilloscope holding the beam from cathode 2 on. Similarly, the remaining three multivibrators also are normally held in an off or nonoscillating condition by associated tubes $V_{4b}$, $V_{10a}$ and $V_{10b}$, and the beams from the remaining cathodes 3, 4 and 5 of the oscilloscope are also normally held on. In the nonoscillating states of the multivibrator tubes $V_{5b}$, $V_{6b}$, $V_{7b}$ and $V_{8b}$ are conductive and their anode currents together with the anode and grid currents of normally conductive tubes $V_{4a}$, $V_{4b}$, $V_{10a}$ and $V_{10b}$ flowing in resistor 40 cause conductor 38 to have a lower potential than point E. Further the grid currents of these tubes flowing in resistors 36—37, 41—42, 43—44 and 45—46 cause the points F to be at a lower potential than conductor 38 and at a still lower potential than point E. Therefore, with tubes $V_{3a}$, $V_{3b}$, $V_{9a}$ and $V_{9b}$ nonconductive, as at the start of the saw-tooth when $t=0$, condensers 47, 48, 49 and 50 acquire equal charges with the polarities shown.

Fig. 2(c) illustrates the waveforms appearing on the anodes of tubes $V_{3a}$, $V_{3b}$, $V_{9a}$ and $V_{9b}$. During each cycle of the saw-tooth wave $V_{9b}$ is cut off for the period $t_0$—$t_1$, $V_{9a}$ for the period $t_0$—$t_2$, $V_{3b}$ for the period $t_0$—$t_3$, and $V_{3a}$ for the period $t_0$—$t_4$. The period $t_0$—$t_1$ is sufficient for condensers 47–50 to reach a steady state of charge as indicated at portion 51 of the grid voltage waveforms in Fig. 2(d). At time $t_1$ conduction in $V_{9b}$ occurs causing a sharp drop in anode potential as shown in Fig.

2(c). Because of the comparatively high values of resistors 45 and 46 the charge in condenser 50 can not change immediately so that this drop is transferred directly to the grid of $V_{10b}$ driving it below the cut-off point as shown in Fig. 2(d). This action stops the $V_{10b}$ current in resistor 52 lowering the cathode of $V_{8a}$ to ground potential, indicated at 53 in Fig. 2(d), and initiating oscillation of multivibrator $V_{8a}$—$V_{8b}$. As the discharge current of condenser 50 declines in resistors 45 and 46 the grid potential of $V_{10b}$ rises exponentially, as at 54 in Fig. 2(d), until conduction is restored in $V_{10b}$ and oscillation of the multivibrator is stopped by the resulting rise in the cathode potential of $V_{8a}$. The duration of the negative keying pulse across resistor 52 due to the above action may be controlled by resistor 45 and, in the case of Channel A is made only long enough to allow two negative pulses to be generated at the anode of $V_{8a}$ as shown in Fig. 2(e).

By the same process as that described above multivibrators $V_{7a}$—$V_{7b}$, $V_{6a}$—$V_{6b}$ and $V_{5a}$—$V_{5b}$ are keyed for successively larger intervals, resistors 43, 42 and 36 being adjusted to provide 3, 4 and 5 negative pulses in Channels B, C and D, respectively, as shown at f, g and h in Fig. 2. At the end of each saw-tooth voltage $V_{3a}$, $V_{3b}$, $V_{9a}$ and $V_{9b}$ are simultaneously returned to cut-off and above-described cycle of operation is restarted.

I claim:

1. In combination with a plurality of information transmission channels, an equal number of normally inoperative means each associated with one of said channels and acting when operative to modify the transmission in its associated channel in a manner different from the transmission modification in the other channels, and cyclic means for rendering each of said transmission modifying means operative once during each cycle for a short period displaced in time from the periods of operation of the other transmission modifying means.

2. In combination with a plurality of information transmission channels, an equal number of normally inoperative means each associated with one of said channels and, when triggered, operative over a short marking period to modify the transmission in its associated channel in a manner different from the transmission modification in the other channels, and means for triggering said transmission modifying means in a repeating sequence with sufficient interval between triggerings that each marking period is displaced in time from the other marking periods.

3. In combination with a multichannel oscilloscope having a beam intensity control electrode for each channel, apparatus for introducing identifying markings in the oscilloscope traces corresponding to the several channels, said apparatus comprising: means normally biasing said control electrodes above cut-off; similar negative pulse train generators equal in number to the number of channels and each coupled to the control electrode for one channel for applying, when operative, a train of negative pulses to said control electrode of sufficient magnitude to drive its potential below the cut-off point; and means for rendering said generators operative for short intervals of time in a repeating sequence, the short operative interval for each generator being different from those of the other generators and displaced therefrom in time.

4. In combination with a multichannel oscilloscope having a beam intensity control electrode for each channel, apparatus for introducing identifying markings in the oscilloscope traces corresponding to the several channels, said apparatus comprising: means normally biasing said control electrodes above cut-off; similar negative pulse train generators equal in number to the number of channels and each coupled to the control electrode for one channel for applying, when operative, a train of negative pulses to said control electrode of sufficient magnitude to drive its potential below the cut-off point; control tubes corresponding in number to the number of generators and each having an anode, a cathode and a control grid; means biasing the grids of said control tubes negatively with respect to the cathodes, said biases exceeding the cut-off voltages by different amounts; means for applying a periodic positive-going saw-tooth voltage wave between said control grids and cathodes in parallel whereby anode conduction in said tubes occurs in a repeating sequence; and means connected between the anode of each control tube and its corresponding generator and operative when conduction occurs in the associated control tube to render the associated generator operative for a predetermined time interval that is different from the time intervals of the other generators.

5. Apparatus as claimed in claim 4 in which the bias difference between adjacent control tubes in said anode conduction sequence is great enough that each of said predetermined generator operating intervals is displaced in time from the others.

References Cited in the file of this patent

UNITED STATES PATENTS

| | | |
|---|---|---|
| 2,455,373 | Lester | Dec. 7, 1948 |
| 2,716,718 | Sonnenfeldt | Aug. 30, 1955 |